July 15, 1952

C. R. BROWN 2,603,060

COOLING MEANS FOR VARIABLE AREA NOZZLES

Filed Sept. 30, 1949

INVENTOR
Charles R. Brown

BY
Ralph T. French
ATTORNEY

Patented July 15, 1952

2,603,060

UNITED STATES PATENT OFFICE 2,603,060

COOLING MEANS FOR VARIABLE AREA NOZZLES

Charles R. Brown, Glen Mills, Pa., assignor to Westinghouse Electric Corporation, East Pittsburgh, Pa., a corporation of Pennsylvania Application September 30, 1949, Serial No. 118,885

1 Claim. (Cl. 60—35.6)

This invention relates to aviation gas turbine power plants of the type equipped with thrust destroyer or variable area exhaust apparatus, and has for an object the provision of an improved variable area nozzle apparatus for a turbojet having an afterburner.

It has been proposed to equip the exhaust nozzle of a turbojet engine with suitably operable shutter elements designed to effect variations in the flow area of the nozzle opening. Since the exhaust end of such an engine tends to become quite hot, particularly when the power plant includes afterburner or thrust augmentor apparatus for burning additional fuel downstream of the usual turbine which drives the compressor of the engine, it is desirable to devise means for ensuring adequate cooling of the nozzle components for avoiding undue thermal expansion and consequent structural strains on the apparatus. Accordingly, another object of the invention is the provision of improved variable area nozzle apparatus constructed and arranged to effect circulation of air over suitable areas of the surfaces most likely to be subjected to excessive heat during operation of the afterburner apparatus, without unduly burdening the power plant with bulky or complicated details of construction.

A feature of the invention is the provision of freely expansible baffle means for diverting cooling air over the desired areas of the movable exhaust nozzle elements when the latter are retracted to provide a fully open orifice or partially opened orifice, as is normally the case during operation of the afterburner apparatus.

These and other objects are effected by my invention as will be apparent from the following description and claim taken in connection with the accompanying drawing, forming a part of this application, in which:

Figure 1:
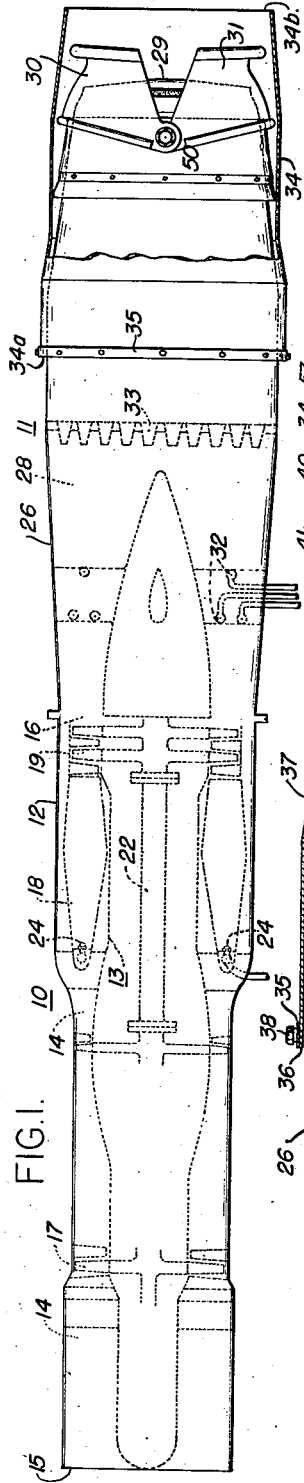
Fig. 1 is a schematic elevational view of a typical aviation turbojet power plant having an afterburner and variable area nozzle apparatus constructed in accordance with the invention.

As shown in Fig. 1 of the drawing, the power plant may comprise a turbojet engine 10 and a tailburner apparatus 11, both of which have substantially cylindrical casing structures mounted in coaxial alinement and adapted to be supported in the fuselage or wing of an aircraft (not shown). The turbojet engine 10 includes an outer casing 12 and an inner core structure generally indicated at 13, which form an annular passageway 14 extending longitudinally through the engine from a forwardly directed air intake opening 15 to a rearwardly disposed turbine discharge passage 16. Operating elements of the turbojet engine are mounted in axial alignment to minimize frontal area, and include an axial-flow compressor 17, an annular combustion apparatus 18, and a turbine 19, the rotor of which is operatively connected to the rotor of the compressor through the medium of a common shaft 22 that is suitably journaled within the core structure 13. In operation, air entering the intake opening 15 is compressed by the compressor 17 and delivered to the combustion apparatus 18, where fuel supplied by way of nozzles 24 is burned to form hot motive fluid, which is expanded through the turbine 19 for driving the compressor 17, and thence supplied through the discharge passage 16 into the afterburner apparatus 11.

The afterburner apparatus 11 may include a generally cylindrical outer casing 26, the forward end of which is suitably secured to the turbine discharge end of the engine casing structure 12. Formed in the casing 26 is an auxiliary combustion chamber 28, which communicates with the aforesaid turbine discharge passage 16 and terminates in a jet discharge opening or nozzle 29, the flow area of which is variable in accordance with the positioning of movable lid or closure members 30 and 31, hereinafter more fully described. Auxiliary fuel supply nozzles 32 are mounted in the combustion chamber 28 for feeding fuel into the path of the heated air and gases flowing from the turbine discharge passage 16. An apertured baffle or flame holder 33 may also be carried in the combustion chamber 28 downstream of the nozzles 32. It will be understood that, when it is desired to operate the afterburner apparatus, fuel will be automatically supplied by way of the nozzles 32 to be burned in the chamber 28 to provide additional thrust energy upon final discharge of the heated motive fluid to atmosphere through the nozzle 29. At the same time, the lid members 30 and 31 will be retracted to their fully open position, substantially as illustrated in the drawing.

Figure 2:
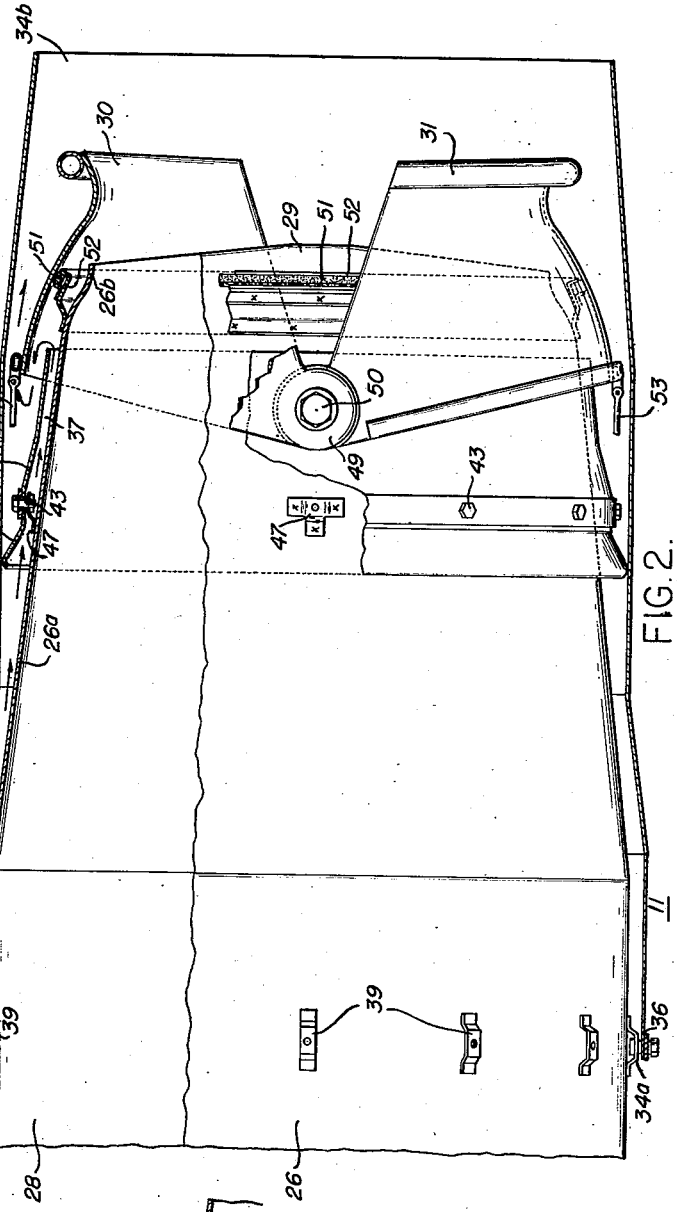
Fig. 2 is an enlarged detail sectional view of the nozzle apparatus shown in Fig. 1.

Referring to Fig. 2, it will be noted that the downstream portion 26a of the cylindrical afterburner casing 26 converges somewhat and terminates in an annular inwardly curved lip 26b, which defines the nozzle opening 29. For supporting the movable lid members 30 and 31 there is provided a substantially cylindrical outer casing or shell 34 having an upstream opening 34a and a downstream opening 34b. The shell 34 is of larger diameter than the afterburner casing 26 and is secured in spaced telescoping relation thereon through the medium of a retainer ring 35 and a plurality of bolt assemblies 36, forming an annular passage 37 between the two casing sections. Each of the bolt assemblies 36 comprises a bolt 38 having a shank which slidably extends through apertures formed in the ring 35, shell 34 and in a bracket 39 carried by the casing 26, preferably with sufficient freedom or lost motion engagement to permit differential thermal expansion of the associated casing sections.

Figure 3:
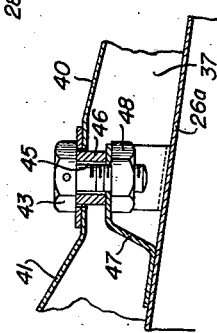
Fig. 3 is a fragmentary enlarged detail sectional view of one of the securing bolt arrangements of the apparatus shown in Fig. 2.

A generally cylindrical baffle 40 having an outwardly flaring annular flexible flange 41 is mounted on the converging portion 26a of the afterburner casing, with the flange 41 directed upstream for supporting engagement with the adjacent inner surface of the shell 34 at a point remote from the bolt assemblies 36. The baffle 40 is carried on a number of circumferentially spaced bolt assemblies 43, and is held in spaced relation between the inner casing portion 26a and the outer shell 34 to form a continuation of the annular passage 37. As best shown in Fig. 3, each of the bolt assemblies 43 comprises a bolt 45 and sleeve 46 received thereon and fitted through an opening in the baffle 40, the shank of the bolt projecting inwardly through an opening in a bracket 47 which is welded to the shell portion 26a and clamped between the sleeve and a nut 48 applied to the end of the bolt. This arrangement is devised to permit differential expansion of the casing portion 26a and the baffle member 40, when subjected to heat incident to operation of the afterburner apparatus. Preferably, the inclined flange 41 is adapted to be spaced slightly from the shell 34 when the apparatus is cool, and to expand into engagement with the shell, as shown, during operation in a heated condition.

The nozzle closure members 30 and 31 are preferably arcuate in form, and have overlapped lateral lug portions 49 pivotally connected to the shell 34 by means of coaxial hinge pins 50, so that the members can be moved inwardly or toward each other to reduce the flow area of the nozzle 29, or outwardly toward the retracted position shown. The inner surfaces of the respective closure members are carried in sliding engagement on suitably curved sealing elements 51, preferably formed of braded wire or other heat resistant material, which are in turn secured to a substantially annular flange 52 welded to the casing adjacent the lip 26b. Any desired actuating means (not shown) may be provided for operating the closure members 30 and 31 through the medium of movable linkage 53 connected thereto.

During operation of the afterburner apparatus 11, with the lid members 30 and 31 retracted, as shown in Fig. 2, to render available the maximum flow area of the nozzle 29, atmospheric air will be caused to flow into the forward annular opening 34a and through the passage 34 for dissipating heat from the afterburner casing 26. The cooling air is then diverted, in the region of the seal flange 52, to flow as indicated by the arrows in Fig. 2 around the forward or pivoted portions of the lid members 30 and 31, and finally passes rearwardly between the outer surfaces of the lid members and shell 34 to the exhaust opening 34b. The seal element 51 at the same time prevents backflow of any hot engine exhaust gases issuing from the jet nozzle 29.

It will thus be seen that, with the relatively simple and light-weight construction and arrangement of the elements of the improved variable area nozzle apparatus embodying the invention, full length cooling of the inner casing and all movable parts is ensured, without necessitating any material extension of the overall dimensions of the power plant.

While I have shown my invention in but one form, it will be obvious to those skilled in the art that it is not so limited, but is susceptible of various changes and modifications without departing from the spirit thereof.

What I claim is:

Variable exhaust nozzle apparatus for a jet engine comprising a substantially cylindrical inner casing terminating in a nozzle opening for engine exhaust gases, a larger substantially cylindrical outer casing surrounding said inner casing, a plurality of circumferentially spaced radially disposed bolt assemblies secured to one of said casings and slidably retained in apertures formed in the other casing for holding said outer casing in differentially expansible spaced relation on said inner casing, said casings being concentrically arranged to form an annular cooling passage having a forwardly directed air inlet and an air outlet disposed near said nozzle opening, a plurality of movable closure elements operatively mounted on said outer casing for varying the flow area of said nozzle opening, said closure elements being retractible into said cooling passage, a sealing flange carried by said inner casing in sealing engagement with said closure elements for cutting off communication from said nozzle opening to said cooling passage, and an annular baffle flexibly mounted between said casings upstream of said sealing flange, the upstream end of said baffle being engageable with the outer casing and its downstream end being spaced between said inner casing and said closure elements for directing cooling air from said passage into heat exchange relation with heated surfaces of the apparatus.

CHARLES R. BROWN.

REFERENCES CITED

The following references are of record in the file of this patent:

UNITED STATES PATENTS

| Number | Name | Date |
| --- | --- | --- |
| 1,572,812 | Rees | Feb. 9, 1926 |
| 2,408,099 | Sherman | Sept. 24, 1946 |
| 2,455,385 | Schairer | Dec. 7, 1948 |
| 2,477,683 | Birmann | Aug. 2, 1949 |
| 2,479,776 | Price | Aug. 23, 1949 |
| 2,481,330 | Neal | Sept. 6, 1949 |
| 2,516,910 | Redding | Aug. 1, 1950 |
| 2,523,842 | Oulianoff | Sept. 26, 1950 |

FOREIGN PATENTS

| Number | Country | Date |
| --- | --- | --- |
| 587,513 | Great Britain | Apr. 29, 1947 |